Aug. 15, 1933.                F. N. CANULETTE                1,922,275
                              CUSHIONED CRANK PIN
                              Filed April 14, 1932
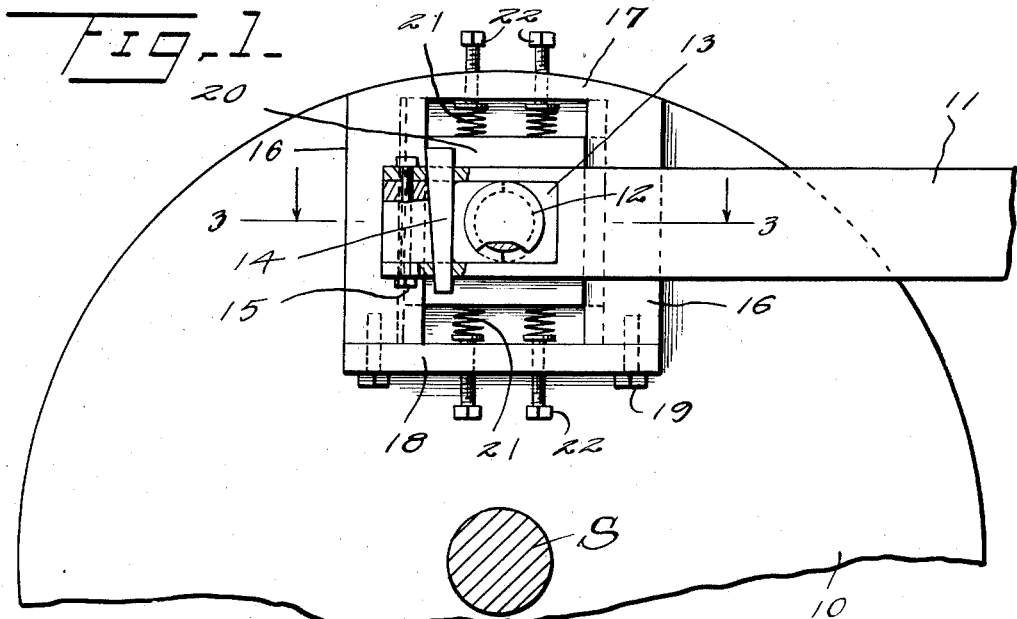
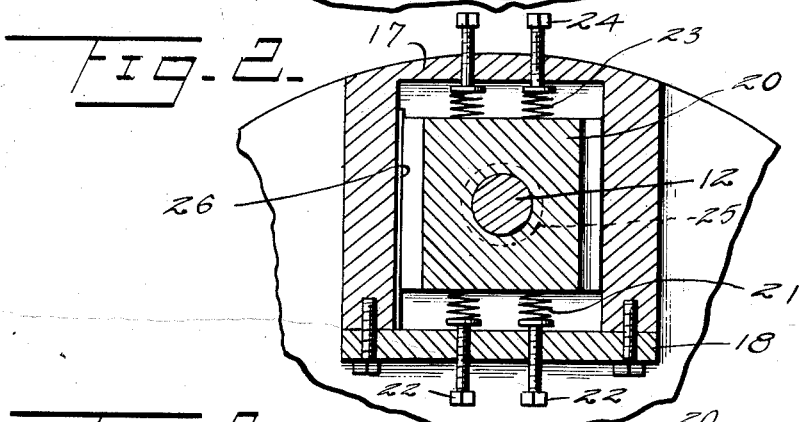
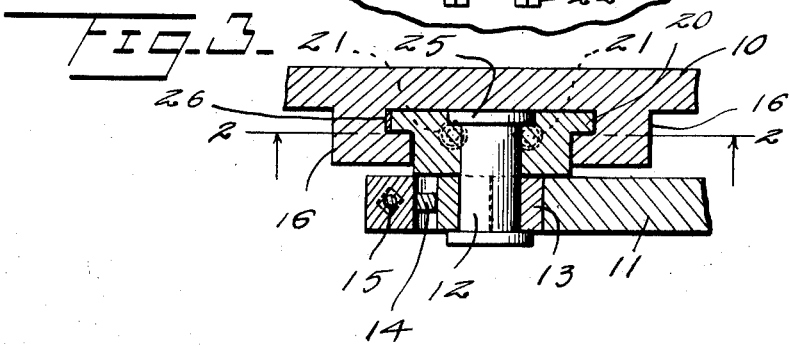
Inventor
F. N. Canulette
By Watson E. Coleman
Attorney Patented Aug. 15, 1933

1,922,275

UNITED STATES PATENT OFFICE 1,922,275

CUSHIONED CRANK PIN

Frank N. Canulette, Slidell, La., assignor to Canulette Ship Building Co. Inc., Slidell, La., a Corporation of Louisiana Application April 14, 1932. Serial No. 605,287

1 Claim. (Cl. 74—38)

This invention relates to adjustable bearings and more particularly to an adjustable bearing or mounting for a crank or pitman.

An object of this invention is to provide a slidable and adjustable pitman bearing by means of which the bearing for the crank pin will not become heated during the movement of the pitman or crank.

Another object of this invention is to provide an adjustable or cushioned bearing which is so constructed as to eliminate undue wear on the crank pin.

The above and various other objects and advantages of this invention will in part be described in and in part be understood from the following detailed description of the present preferred embodiment, the same being illustrated in the accompanying drawing, wherein:—

Figure 1 is a detail side elevation partly in section of a device constructed according to the preferred embodiment of this invention.

Figure 2 is a sectional view taken substantially on the line 2—2 of Figure 3.

Figure 3 is a sectional view taken on the line 3—3 of Figure 1.

Referring to the drawing wherein like characters of reference designate corresponding parts throughout the several views, the letter S designates a shaft which may be either a driven or driving shaft and is rotatably mounted on suitable bearings (not shown) and the numeral 10 designates a disk or plate which is secured to the shaft S. A pitman 11 is mounted on a pin 12, the pitman 11 being provided with a split bearing 13 which is held in adjusted position by means of a wedge or tapering member 14. The bifurcated end of the pitman 11 is held in tight engagement with the bearing sections 13 by means of a tightening bolt 15 or the like.

In order to cushion the strain applied by the pitman 11 on the crank pin 12, I have provided a pair of guide members 16 which are secured to or formed with the disk 10 adjacent the periphery thereof, the guide members being closed at the outer end by means of a plate 17, which is formed or cast with the disk 10 and the guides 16. The inner ends of the guides 16 are closed by a plate 18 which is bolted, as at 19, to the guides 16.

A slide 20 is slidably disposed between the guides 16 and is of a length shorter than the distance between the plate 18 and the end member 17 so that it can have longitudinal movement within the parallel guides 16. Springs or resilient elements 21 are interposed between the inner end of the slide 20 and the inner face of the end plate 18, and these springs 21 are tensioned or adjusted by means of bolts 22 or the like which pass through the end plate 18.

Springs or cushioning elements 23 are interposed between the outer end of the slide 20 and the end member 17 and are adjusted or tensioned by means of bolts 24 or the like. The crank pin 12 is preferably provided with an inner flange or bead 25 which is disposed within a cavity or recess provided in the inner face of the slide 20 so that this pin 12 cannot be pulled out of the slide 20. A wedge or shim 26 is interposed between one edge of the slid 20 and the inner edge of one guide 16 so as to take up any wear caused within the guide 16 and the slide 20 by reason of the strain applied to the slide 20 through the crank pin 12.

In the operation of this device, the pitman 11 can be connected to a suitable power member (not shown) and the shaft S can be either the drive shaft or a driven shaft for driving a second element which is offset parallel to the shaft S. The springs 21 and 23 can be tensioned so that endwise movement of the slide 20 will be properly resisted by the springs 21 and 23 whereas sidewise movement of the slide 20 is prevented by reason of the guides 16. Under the action of the springs 21 and 23, the crank pin 12 can have relative movement either in or out on the plate or disk 10, and this movement is only sufficient to prevent the bearings 13 from becoming heated during the rotation of the shaft S.

It is, of course, understood that various changes and modifications may be made in the details of construction and design of the above specifically described embodiment of this invention without departing from the spirit thereof, such changes and modifications being restricted only by the scope of the following claim.

What is claimed is:—

A crank pin mounting and adjusting means comprising a disk, a pair of parallel guides on one face of the disk, a slide movable in the guides, threaded members supported by the disk in the path of the slide, and cushioning means interposed between said threaded members and the confronting ends of the slide to cushion the movement of the slide, said threaded members also providing means whereby the slide may be adjusted relative to the axis of the disk.

FRANK N. CANULETTE.